(12) United States Patent
Otsuka et al.

(10) Patent No.: US 11,593,436 B2
(45) Date of Patent: Feb. 28, 2023

(54) INFORMATION PROVISION DEVICE, INFORMATION PROVISION METHOD, AND PROGRAM

(71) Applicant: NIPPON TELEGRAPH AND TELEPHONE CORPORATION, Tokyo (JP)

(72) Inventors: Atsushi Otsuka, Tokyo (JP); Kyosuke Nishida, Tokyo (JP); Narichika Nomoto, Tokyo (JP); Hisako Asano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 150 days.

(21) Appl. No.: 16/968,924

(22) PCT Filed: Feb. 13, 2019

(86) PCT No.: PCT/JP2019/005162
§ 371 (c)(1),
(2) Date: Aug. 11, 2020

(87) PCT Pub. No.: WO2019/159986
PCT Pub. Date: Aug. 22, 2019

(65) Prior Publication Data
US 2021/0049210 A1 Feb. 18, 2021

(30) Foreign Application Priority Data
Feb. 13, 2018 (JP) .............................. JP2018-023295

(51) Int. Cl.
*G06F 16/9035* (2019.01)
*G06F 16/9038* (2019.01)
(Continued)

(52) U.S. Cl.
CPC ...... *G06F 16/9035* (2019.01); *G06F 16/9038* (2019.01); *G06F 16/90324* (2019.01);
(Continued)

(58) Field of Classification Search
CPC ............. G06F 16/9035; G06F 16/9038; G06F 16/90324; G06F 40/35; G06N 5/043; H04L 51/10; H04L 51/02
See application file for complete search history.

(56) References Cited

U.S. PATENT DOCUMENTS 8,769,417 B1 * 7/2014 Robinson ............ G06F 16/9535
715/764
10,581,765 B2 * 3/2020 Koukoumidis ....... G06F 16/248
(Continued)

FOREIGN PATENT DOCUMENTS

JP 2013-254420 12/2013
JP 2016-133919 7/2016

*Primary Examiner* — Robert W Beausoliel, Jr.
*Assistant Examiner* — Susan F Rayyan (57) ABSTRACT

To enable provision of appropriate information for a user query even in a case there are multiple information provision modules which are different in answer generation processing. A query sending unit 212 sends a user query to each one of a plurality of information provision module units 220 that are different in the answer generation processing and that each generate an answer candidate for the user query. An output control unit 214 performs control such that the answer candidate acquired from each one of the plurality of information provision module units 220 is displayed on a display unit 300 on a per-agent basis with information on an agent associated with that information provision module unit 220.

17 Claims, 5 Drawing Sheets

(51) Int. Cl.
  *G06F 16/9032* (2019.01)
  *G06F 40/35* (2020.01)
  *G06N 5/043* (2023.01)
  *H04L 51/10* (2022.01)

(52) U.S. Cl.
  CPC .............. *G06F 40/35* (2020.01); *G06N 5/043* (2013.01); *H04L 51/10* (2013.01)

(56) References Cited

U.S. PATENT DOCUMENTS

| | | | |
|---|---|---|---|
| 10,796,102 B2* | 10/2020 | Galitsky | G06F 40/35 |
| 2009/0281966 A1* | 11/2009 | Biggs | H04L 51/18 |
| | | | 706/11 |
| 2011/0099052 A1* | 4/2011 | Brun | G06Q 10/06 |
| | | | 706/54 |
| 2012/0197939 A1* | 8/2012 | Ben Shahar | G06F 16/3334 |
| | | | 707/E17.014 |
| 2014/0122056 A1* | 5/2014 | Duan | H04L 51/02 |
| | | | 704/9 |
| 2014/0122618 A1* | 5/2014 | Duan | H04L 51/02 |
| | | | 709/206 |
| 2014/0122619 A1* | 5/2014 | Duan | G06F 40/20 |
| | | | 709/206 |
| 2015/0379087 A1* | 12/2015 | Lee | G06F 16/3329 |
| | | | 707/722 |
| 2017/0247899 A1* | 8/2017 | Faries | E04H 12/223 |
| 2017/0270431 A1* | 9/2017 | Hosabettu | G06F 9/4881 |
| 2018/0011927 A1* | 1/2018 | Lee | G06F 16/334 |
| 2018/0039632 A1* | 2/2018 | Tsu | G06F 40/30 |
| 2018/0052664 A1* | 2/2018 | Zhang | G06F 16/90332 |
| 2018/0210874 A1* | 7/2018 | Fuxman | G06F 40/56 |
| 2018/0225365 A1* | 8/2018 | Altaf | G06F 16/3344 |
| 2019/0138600 A1* | 5/2019 | Krishnan | G06F 40/35 |
| 2019/0138660 A1* | 5/2019 | White | G06F 16/3329 |
| 2019/0236085 A1* | 8/2019 | Galitsky | G10L 15/08 |
| 2020/0202194 A1* | 6/2020 | Wu | G06F 16/24575 |
| 2021/0035576 A1* | 2/2021 | Kang | G10L 15/22 |

* cited by examiner

INFORMATION PROVISION DEVICE, INFORMATION PROVISION METHOD, AND PROGRAM

CROSS-REFERENCE TO RELATED APPLICATIONS

This application is a U.S. 371 Application of International Patent Application No. PCT/JP2019/005162, filed on 13 Feb. 2019, which application claims priority to and the benefit of JP Application No. 2018-023295, filed on 13 Feb. 2018, the disclosures of which are hereby incorporated herein by reference in their entireties.

TECHNICAL FIELD

The present invention relates to an information provision device, an information provision method and a program. In particular, it relates to an information provision device, an information provision method and a program for providing information in response to a query.

BACKGROUND ART

In recent years, chatbot systems in which users and the system exchange information for handling queries or the like in natural language through a chatting system have been receiving attention.

In a conventional chatbot system, the system determines information to be presented or the content of utterance based on the content of a user query and gives an answer. With the continuing enhancement of AI-related abilities in these years, however, information provision systems in fact increasingly involve combined use of functions that are different is databases as information sources or algorithms.

For example, when a query "recipes using potatoes" is made to a chatbot related to cooking, a recipe search algorithm that searches a recipe database for appropriate information is executed. In contrast, for a query like "What to do with sprouted potatoes?", a FAQ search algorithm that presents information by making reference to frequently asked questions (FAQs) is executed. Further, when there is an input of chat like "It's been hot lately, hasn't it?", a chatting dialogue algorithm could be executed. Thus, it is necessary to switch the algorithm to be called or the database to be referenced as appropriate depending on the content of the user query.

CITATION LIST

Patent Literature

Patent Literature 1: Japanese Patent Laid-Open No. 2013-254420
Patent Literature 2: Japanese Patent Laid-Open No. 2016-133919

SUMMARY OF THE INVENTION

Technical Problem

As mentioned above, creation of an information provision chatbot that combines multiple algorithms and databases requires an utterance comprehension function for correctly understanding the content of a user query and a task classification function for referencing a correct algorithm or database for the content of the user query.

As these techniques do not have perfect accuracy at present, however, they can fail in utterance comprehension or task classification. The chatbot system would then output an answer or information not useful for the user, leading to lower user satisfaction with the chatbot system.

Also, the task classification function is typically implemented by creating rules for classification or by means of a classifier based on machine learning. However, addition of a new algorithm or database or deletion of an existing algorithm requires creating the rules or designing and learning the task classifier again, which complicates flexible operation.

The present invention has been made in view of the foregoing, and an object thereof is to provide an information provision device, an information provision method and a program that can provide appropriate information for a query even in a case there are multiple information provision modules which are different in answer generation processing.

Means for Solving the Problem

An information provision device according to the present invention is an information provision device that generates and displays an answer to a user using a plurality of types of answer generation processing in response to a user query. The information provision device includes: an input unit that accepts an input of the user query from the user; a plurality of information provision module units that are different in the answer generation processing and that each generate an answer candidate for the user query; a query sending unit that sends the user query accepted by the input unit to each one of the plurality of information provision module units; an answer acquiring unit that acquires the answer candidate from each one of the plurality of information provision module units; and an output control unit that performs control such that the answer candidate acquired from each one of the plurality of information provision module units is displayed on a display unit on a per-agent, basis with information on an agent associated with the information provision module unit.

An information provision method according to the present invention is an information provision method for generating and displaying an answer to a user using a plurality of types of answer generation processing in response to a user query. The method includes the step of: accepting, by an input unit, an input of the user query from the user; sending, by a query sending unit, the user query accepted by the input unit to each one of a plurality of information provision module units that are different in the answer generation processing and that each generate an answer candidate for the user query; acquiring, by an answer acquiring unit, the answer candidate from each one of the plurality of information provision module units; and performing control, by an output control unit, such that the answer candidate acquired from each one of the plurality of information provision module units is displayed on a display unit on a per-agent basis with information on an agent associated with the information provision module unit.

With the information provision device and information provision method according to the present invention, the input unit accepts an input of a user query from the user, and the query sending unit sends the user query accepted by the input unit to each one of a plurality of information provision module units that are different in the answer generation processing and that each generate an answer candidate for the user query.

Then, the answer acquiring unit acquires the answer candidate from each one of the plurality of information provision module units, and the output control unit performs control such that the answer candidate acquired from each one of the plurality of information provision module units is displayed on a display unit on a per-agent basis with information on an agent associated with that information provision module unit.

In this manner, control is performed so that the answer candidate acquired from each one of the plurality of information provision module units is displayed on a display unit with information on an agent associated with that information provision module unit. This enables appropriate information to be provided for a query even in a case there are multiple information provision modules which are different in answer generation processing.

The information provision device according to the present invention may further include a continuity determination unit that determines whether or not the user query accepted by the input unit has relevance to at least one of a past user query or an answer to a past user query. When the continuity determination unit determines that there is relevance, the query sending unit may send the user query accepted by the input unit to each one of the plurality of information provision module units with at least one of the past user query and an answer that was displayed by the output control unit in past, and the information provision module units may each generate the answer candidate using the user query accepted by the input unit and at least one of the past user query and the answer that was displayed by the output control unit in the past.

In the information provision device according to the present invention, when a plurality of the answer candidates are acquired, the output control unit may perform control such that overlapping ones of the answer candidates are aggregated when displayed on the display unit, or such that the answer candidates are displayed on the display unit in accordance with their similarity with the user query.

In the information provision device according to the present invention, when displaying the agents, the output control unit may cause agents having character to be displayed.

In the information provision device according to the present invention, the input unit may accept an input of the user query from the user and also accept designation of a query target agent, and when designation of the query target agent is accepted, the output control unit may cause answer candidates having a high degree of relevance to the user query among the answer candidates acquired by the answer acquiring unit to be displayed on the display unit together with the query target agent.

A program according to the present invention is a program for causing a computer to function as the units of the information provision device set forth above.

Effects of the Invention

With the information provision device, information provision method and program of the present invention, appropriate information can be provided for a user query even in a case there are multiple information provision modules which are different in answer generation processing.

DESCRIPTION OF EMBODIMENTS

Embodiments of the present invention are now described with reference to the drawings.

Overview of Information Provision Device According to First Embodiment of the Present Invention First, an embodiment of the present invention is generally described.

In this embodiment, a concept of multi-agent is introduced in a chatbot system, where one agent is assigned to one answer generation processing function (hereinafter, an information provision module).

Each agent is independent and creates an answer to a user query on its own. In this embodiment, output of an information provision module is referred to as "answer candidate" and a final output to the user is referred to as "answer".

Then, by finally controlling the answer candidates from all the agents, a flexible chatbot system is achieved.

In this embodiment, information is presented to a user through interactive interaction between the user and agents. Accordingly, it is determined whether a user query is a continuation of a previous user query or an entirely new user query.

If the user query is a continuation of a previous user query, it is necessary to give an answer taking into account information that was included in the previous user query. In this embodiment, when a user inputs a user query, it is determined whether the user query is relevant to a previous user query. If so, the user query is sent to the information provision modules corresponding to the individual agents with addition of information on the previous user query.

In this manner, using history information to create an answer for a subsequent user query enables narrowing down to information useful for the user. In doing so, since a task is set for each agent, an intent (task) of a user's question is easy to estimate based on to whom the user asked the question.

Further, since variations in the content of an answer to be presented to the user increase as there are more agents, more information are available for estimating the user's intent or useful information, such as to which answer the user made a further query or which answer the user ignored among those multiple answers.

In this embodiment, an agent is assigned to each information provision module. Here, all the agents are able to output an output as a chatbot. In response to a user query, an answer candidate as an output result from an information provision module that is responsible for responding to a question, an answer candidate as an output result from an information provision module that is responsible for FAQ search, and an answer candidate as an output result from an information provision module that is responsible for chat dialogue, among the information provision modules, can be output at a time as answers representing the provided (suggested) results from the separate agents.

In other words, information from multiple types of answer generation processing included in the system can be presented at a time without executing the task classification function and the like.

Also, different pieces of information are presented at a time by multiple information provision modules in response to the content of a user query. The user thus can view various information from the individual information provision modules through a single query, which improves the diversity of information that the user can obtain.

In short, the multi-agent chatbot creates an effect of various kinds of information from multiple agents with different features appearing to be presented in a comprehensible organization. Also, while information that can be presented in a chat system is limited to two sentences or so at most, more information can be presented without losing readability by adopting a form of answering from multiple agents.

Further, addition of new functions or deletion of functions are facilitated because addition of a new algorithm or database or deletion of an algorithm or database only requires simply adding a new information provision module or agent or deleting one at the same time.

In addition, as each information provision module is capable of operating independently, fast operation is possible such as by distributed processing even when the types of information provision modules have increased.

Figure 1:
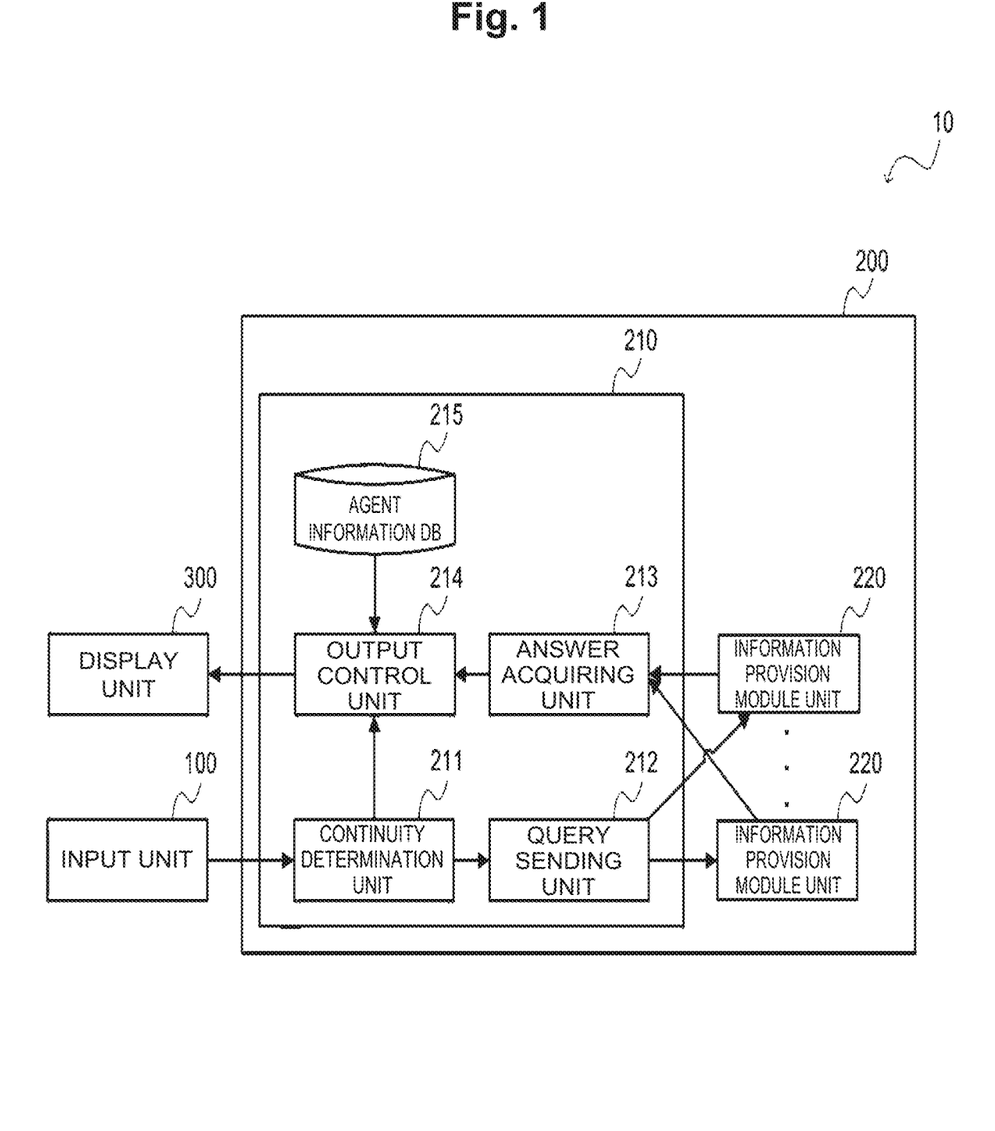
FIG. 1 schematically shows an exemplary configuration of an information provision device according to an embodiment the present invention.

Configuration of the Information Provision Device According to the First Embodiment of the Present Invention Referring to FIG. 1, the configuration of an information provision device 10 according to an embodiment of the present invention is described. FIG. 1 is a block diagram showing a configuration of the information provision device 10 according to an embodiment of the present invention.

The information provision device 10 is composed of a computer having a CPU, a RAM, and a ROM storing a program for executing an information provision processing routine, described later. Functionally, it is configured as shown below.

As shown in FIG. 1, the information provision device 10 according to this embodiment is an information provision device that displays answers from information provision module units which generate answers for a user in response to a user query using multiple types of answer generation processing, and includes an input unit 100, a control unit 200, and a display unit 300.

The input unit 100 accepts an input of a user query from a user. In this embodiment, the user query is assumed to be text information. The user query may instead be a natural sentence, a list of keywords, or text as a voice recognition result. The user query may be in natural language format or in keyword format.

The input unit 100 then passes the accepted user query to a continuity determination unit 211.

The control unit 200 performs control so that answers to the user will be displayed on the display unit 300 in response to the user query.

More specifically, the control unit 200 includes an agent managing unit 210 and N (N being an integer greater than 1) information provision module units 220 which are different in answer generation processing. The answer generation processing refers to, for example, processing for generating an answer to a user query using combination of a database and an algorithm or processing for generating an answer to a user query using a combined database and algorithm, such as a scenario of a scenario-based dialogue system.

An algorithm as called herein refers to a method for outputting a reply candidate in response to a user query. For example, it consists of a function for extracting information necessary for obtaining reply candidates from input information (the user query), a function for selecting or generating an appropriate next operation from the extracted result, and the like. Although referred to as an algorithm herein, it may be anything that takes a user query as input and performs processing for obtaining reply candidates.

The agent managing unit 210 receives an answer candidate for the user query from each information provision module unit 220 and generates answers to the user.

More specifically, the agent managing unit 210 includes a continuity determination unit 211, a query sending unit 212, an answer acquiring unit 213, an output control unit 214, and an agent information DB 215.

The continuity determination unit 211 determines whether the user query accepted by the input unit 100 has relevance to at least one of a past user query or an answer to a past user query.

More specifically, the continuity determination unit 211 determines whether the current user query is relevant to a previous user query. The continuity determination unit 211 first retrieves M or more preceding user queries of the user from history information stored in a memory (not shown), and determines whether their contents are relevant to the current user query or not. M is a predetermined integer greater than 0, and the Mth preceding through the most recent user queries are called "previous user queries". The memory may be provided in the continuity determination unit 211 or may be an external memory.

The history information is information on the previous user queries. Information on the previous user queries is metainformation such as M number of previous user queries, answers from the agents corresponding to the previous user queries, and an agent to which the user paid attention during the user query (mention information).

Here, the continuity determination unit 211 performs determination on relevance as follows.

Process (1): If the current user query contains a symbol representing a reply (e.g., mention: @) or content matching a predetermined rule, it is unconditionally determined to have relevance.

Process (2): The semantic similarity between the current user query and a previous user query saved in the memory is calculated, and if the similarity is above an established threshold, it is determined that there is relevance.

Here, the symbol representing a reply or the predetermined rule for Process (1) may be set as desired (an exemplary symbol: @, as exemplary rule: whether an agent name is present in the user query or not, etc.).

For calculation of the semantic similarity in Process (2), any calculation method for calculating similarity between texts may be employed. For example, a method such as counting the number of words that are common to the current and previous user queries may be employed. Alternatively, a continuity determination method using machine learning may be used (Reference Literature 1).

[Reference Literature 1] Japanese Patent No. 6097791

In calculation of the semantic similarity, the "answer" from each information provision module for a previous user query may be used in place of "previous user queries". Alternatively, a "user query" and an "answer" may be used in combination. Metainformation, such as an agent to which the user paid attention during a previous user query (mention information), may also be utilized in combination.

When the semantic similarity is calculated with M of 2 or greater, calculation of similarity may be performed M times for the "current user query" and the M "previous user queries" separately, or calculation of similarity may be performed only once by integrating the contents of the M previous user queries into one piece of text.

When it is determined that there is relevance, the continuity determination unit 211 passes the current user query and history information to the query sending unit 212. In doing so, it may pass information on the similarity between the current user query and the previous user queries as calculated in Process (2) together. Alternatively, of the M previous user queries included in the history information, only ones for which the similarity calculated in Process (2) is above an established threshold may be passed to the query sending unit 212 as history information along with the current user query.

When it is determined that there is no relevance, the continuity determination unit 211 passes the current user query to the query sending unit 212.

The continuity determination unit 211 also adds and saves the current user query in the history information in the memory.

The query sending unit 212 sends the user query accepted by the input unit 100 to each of the information provision module units 220.

More specifically, the query sending unit 212 sends the user query to each one of the information provision module units 220. If it has acquired the history information from the continuity determination unit 211 as well, the query sending unit 212 also sends the history information to each one of the information provision module units 220.

The answer acquiring unit 213 acquires an answer candidate from each one of the multiple information provision module units 220.

More specifically, the answer acquiring unit 213 acquires the answer candidate from each information provision module unit 220 and passes the acquired answer candidates to the output control unit 214.

The output control unit 214 performs control such that the answer candidate acquired from each one of the information provision module units 220 is displayed on the display unit 300 on a per-agent basis together with the agent associated with that information provision module unit 220.

More specifically, the output control unit 214 associates the answer candidate from each information provision module unit 220 received from the answer acquiring unit 213 with information on the corresponding agent stored in the agent information DB 215. Information on the agent is information such as an image of the agent, the agent's name, its way of talking and the like, for example; each agent has different character.

An information provision module unit 220 and an agent essentially correspond one-to-one. However, when mention (@ . . . ) is contained in the user query as in the example of FIG. 4, an answer candidate from a different information provision module unit 220 than the one stored in the agent information DB 215 may be output in association with the agent referred to by the mention.

That is, either multiple agents may be associated with one information provision module unit 220 or one agent may be associated with multiple information provision module units 220. Multiple agents may give the same answer using the same information provision module unit 220, or when there are multiple information provision module units 220 of similar types, one agent may give a reply.

Then, the output control unit 214 passes the agent images, the agent names, and the answer candidates to the display unit 300 and causes the answer candidates to be displayed on the display unit 300 with the associated agents on a per-agent basis.

The output control unit 214 also stores the displayed answer candidates in a memory used by the continuity determination unit 211.

The agent information DB 215 stores information on the agents in advance.

Each information provision module unit 220 uses answer generation processing to generate an answer candidate for the user query.

More specifically, upon acquiring the user query from the query sending unit 212, the information provision module unit 220 first performs preprocessing corresponding to its function on the user query acquired.

The functions can be various chatbot features, e.g., Web search, FAQ search, and chat response.

The preprocessing can be, for example, morphological analysis in Web search, and morphological analysis, syntactic analysis and named entity extraction in FAQ search.

The multiple information provision module units 220 operate functionally independently from each other. Accordingly, each information provision module unit 220 performs processing on its own, including preprocessing such as morphological analysis. This is because required preprocessing is expected to differ from one function to another.

If the information provision module units 220 have common preprocessing (e.g., morphological analysis in Web search and FAQ search), the query sending unit 212 may be configured to perform the common preprocessing. This is for increasing processing speed by performing the common preprocessing beforehand. In such a case, the query sending unit 212 is configured to send the result of preprocessing to the appropriate information provision module units 220.

Next, the information provision module unit 220 generates an answer candidate based on the answer generation processing corresponding to its function. If the answer generation processing is a combination of an algorithm and a database, an answer candidate can be generated using an algorithm that performs Web search on the Web as a database, using an algorithm that searches a FAQ database, or using a chat response database and an algorithm for generating chat responses, for example. In doing so, the information provision module unit 220 generates the answer candidate using a measure of the similarity between the user query and an entry in each database or the like. The measure used in generation of an answer candidate may be different depending on the algorithm or database for each information provision module unit 220. In a case where previous user queries have been input as well, an answer candidate is generated further in consideration of the similarity with the previous user queries.

Then, the information provision module unit 220 sends the generated answer candidate to the answer acquiring unit 213. Although in FIG. 2 text-based information such as Web search is presented as the answer candidates of the information provision module units 220, any answer candidates corresponding to the functions of the information provision module units 220 may be adopted, such as images or sound.

The display unit 300 displays the answer candidate acquired from each one of the multiple information provision module units 220 from the output control unit 214 on a per-agent basis along with information on the agent associated with that information provision module unit 220.

More specifically, after receiving answers (agent images, agent names, and answer candidates) from the output control unit 214, the display unit 300 displays answers on a user interface. The interface is not limited to one that outputs images and text but may be one that outputs sound or the like.

Figure 3:
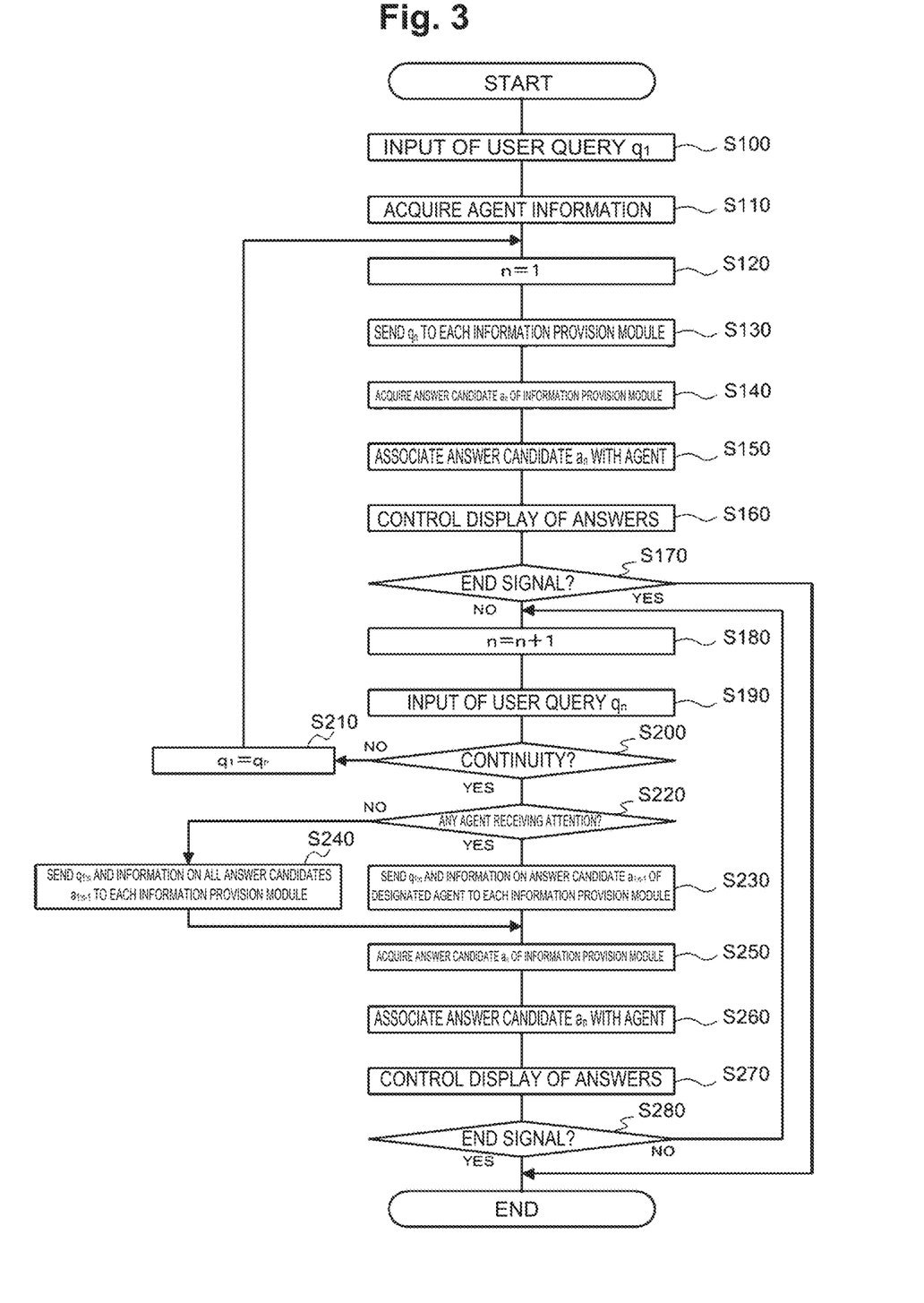
FIG. 3 is a flowchart illustrating an information provision processing routine for the information provision device according to an embodiment the present invention.

Effects of the Information Provision Device According to the First Embodiment of the Present Invention FIG. 3 is a flowchart illustrating an information provision processing routine according to an embodiment of the present invention.

When a user query is input to the input unit 100, the information provision processing routine shown in FIG. 3 is executed in the control unit 200.

First, at step S100, the input unit 100 accepts an input of a user query $q_1$ from the user.

At step S110, the output control unit 214 retrieves information on each agent stored in the agent information DB 215.

At step S120, the agent managing unit 210 sets n=1.

At step S130, the query sending unit 212 sends the user query $q_1$ accepted by the input unit 100 to each one of the multiple information provision module units 220.

At step S140, the answer acquiring unit 213 acquires an answer candidate $a_n$ from each of the multiple information provision module units 220.

At step S150, the output control unit 214 associates the answer candidate $a_n$ from each information provision module unit 220 received from the answer acquiring unit 213 with the information on the corresponding agent stored in the agent information DB 215.

At step S160, the output control unit 214 passes the information on the agent and the answer candidate $a_n$ to the display unit 300 and causes the answer candidate $a_n$ to be displayed on the display unit 300 with the associated agent on a per-agent basis.

At step S170, it is determined whether an end signal has been input from the user or not.

If an end signal has been input (YES at step S170), the processing ends.

If an end signal has not been input (NO at step S170), then at step S180, n is incremented by 1.

At step S190, the input unit 100 accepts an input of a user query $q_n$ from the user.

At step S200, it is determined whether the user query $q_n$ accepted by the input unit 100 has relevance to a past user query or not.

If it is determined there is no relevance (NO at step S200), then at step S210, the input user query $q_n$ is set as $q_1$ and the flow returns to step S120 to perform the processing of steps S120 through S160.

If it is determined that there is relevance (YES at step S200), then at step S220, it is determined whether there is any agent the user is paying attention to.

If there is an agent the user is paying attention to (YES at step S220), then at step S230, the query sending unit 212 sends all of the user queries $q_1$ through $q_n$ and answer candidates $a_1$ through $a_{n-1}$ from the agent in question that have been displayed to the user in the past (history information) to each information provision module unit 220.

If there is no agent the user is paying attention to (NO at step S220), then at step S240, the query sending unit 212 sends all of the user queries $q_1$ through $q_n$ and the answer candidates $a_1$ through $a_{n-1}$ from all the agents (history information) to each information provision module unit 220.

At step S250, the answer acquiring unit 213 acquires the answer candidate $a_n$ from each of the multiple information provision module units 220.

At step S260, the output control unit 214 associates the answer candidate $a_n$ from each information provision module unit 220 received from the answer acquiring unit 213 with information on the corresponding agent stored in the agent information DB 215.

At step S270, the output control unit 214 passes the information on the agent and the answer candidate $a_n$ to the display unit 300 and causes the answer candidate $a_n$ to be displayed on the display unit 300 with the associated agent on a per-agent basis.

At step S280, it is determined whether an end signal has been input from the user or not.

If an end signal has not been input (NO at step S280), the flow proceeds to step S180 to repeat the processing.

If an end signal has been input (YES at step S280), the processing ends.

As has been described, the information provision device according to this embodiment, performs control such that an answer candidate acquired from each one of the multiple information provision module units is displayed on the display unit along with information on the agent associated with that information provision module unit. It thus can provide appropriate information for a user query even in a case there are multiple information provision modules that are different in answer generation processing.

The information provision device according to this embodiment is made up of the functions of the following three components. First, the continuity determination unit determines whether a user query has relevance to at least one of a past user query or an answer to a past user query. Then, if the continuity determination unit determines that there is relevance, the query sending unit sends the user query to each one of the multiple information provision module units with at least one of the past user query and an answer that was displayed by the output control unit in the past. Then, the information provision module units each generate an answer candidate using the user query and at least one of the past user query and the answer that was displayed by the output control unit in the past. In this way, answers can be made with narrowed information useful for the user, so appropriate information can be provided for the user query.

In this embodiment, when displaying agents, the information provision module units 220 can display agents having character.

Multiple agents being present and information presented in them differing from each other means that a sort of "personalization" is applied to them. However, the user sometimes cannot decide which agent he/she should ask a question because the user need to check the content.

Figure 2:
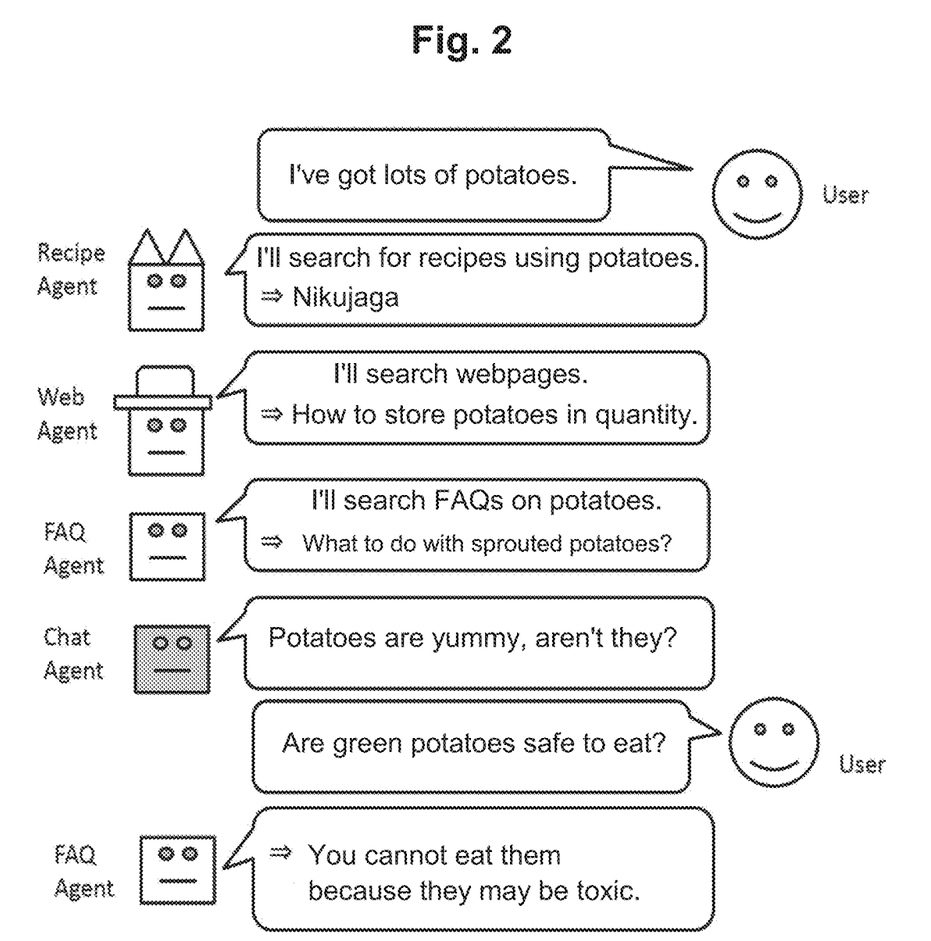
FIG. 2 shows an exemplary interface of the information provision device according to an embodiment the present invention.

Thus, agents having character are displayed on the display unit 300, such as an agent wearing a hat (the Web Agent in FIG. 2) and a colored agent (the Chat Agent in FIG. 2). In addition to agent images, a variety of character such as a habit of saying like adding a particular word at the end of a phrase or a dialect may be applied.

Then, designing the output images of and/or names of the agents allows the user to find that "the red agent will always present a FAQ search result", for example.

That is, giving character to each agent facilitates the user remembering which agent is in charge of what kind of function. Thus, usability can be improved. Also, as the character itself has information on its function, such as "being an agent for searching FAQs", information for presentation to the user can be made more compact without losing readability. For instance, when the FAQ Agent answers in the example of FIG. 5, the user can intuitively know what the agent consulted for making the reply even without an indication like "searched the FAQs".

Overview of Information Provision Device According to a Second Embodiment of the Present Invention In the first embodiment, answer candidates are generated as many as the number of the information provision modules because each information provision module presents information it considers optimal for the input.

In the second embodiment, after all the answer candidates as output results from the information provision modules have been submitted, a degree of relevance between the user query and the answer candidates is used to select and output an agent that is associated with an answer candidate relevant to the user query.

Ranking is also performed for determining an order of display in displaying the answer candidates. For the ranking, the degrees of relevance between the user query and the answer candidates are used.

Such a degree of relevance is computed based on the semantic similarity between the user query and the answer candidate and a score (answer score) output by each information provision module.

An agent can be regarded as an information provision interface. Thus, which agent is to tell the result of execution of each information provision module (to display the result to the user) may be determined. That is, correspondence between information provision modules and agents may be dynamically changed.

For example, in FIG. 2, in response to a user's question or a user query, "Are green potatoes safe to eat?", the FAQ Agent returns a FAQ search result as a reply result that is considered to be optimal. Here, when the user says a similar user query to the Web Agent as in FIG. 4, a FAQ search result may be replied from the Web Agent. As a further example, a method like FIG. 5 is also conceivable.

This has the effect of being able to maintaining the consistency of interaction between the agents and the user.

Configuration of the Information Provision Device According to the Second Embodiment of the Present Invention The configuration of the information provision device 10 according to the second embodiment of the present invention is described. Components similar to ones of the information provision device 10 according to the embodiment above are given the same reference numerals and detailed descriptions are omitted.

Each one of the multiple information provision module units 220 outputs one or more answer candidates and an answer score. The answer score is a score indicative of appropriateness as an answer to the user query and is computed according to the similarity between the user query and the answer candidate, for example.

The answer acquiring unit 213 acquires one or more answer candidates and an answer score from each one of the multiple information provision module units 220, and passes the answer candidates and answer scores to the output control unit 214.

The output control unit 214 selects agents for display by the display unit 300 based on the answer candidates and answer scores it acquired.

More specifically, the output control unit 214 selects agents for display by the display unit 300 based on a relevance score score (q, $D_i$) calculated according to Expression (1):

[Expression 1]

$$\text{score } (q, D_i) = \lambda \, sim(q, D_i) + (1-\lambda) \text{ score } (D_i) \quad (1)$$

Here, q is the user query, and $D_i$ is the answer candidate acquired from the information provision module unit 220 corresponding to the ith agent. The score ($D_i$) is the answer score acquired from the answer candidate corresponding to the ith agent. The value $\lambda$ is a coefficient, determined within a range of 0 to 1.0 manually or by machine learning.

When the number N of information provision module units 220 is two or greater, the output control unit 214 displays only top K output results with the agents with reference to the relevance score score (q, $D_i$), or displays only the answer candidates from those information provision module units 220 that have a relevance score above a threshold, together with the agents.

Here, K is any integer greater than 0, which may be a predetermined value or may be dynamically set in accordance with the size of a screen of an interface as the destination of output. The value sim (q, $D_i$) is the semantic similarity between the user query and an answer candidate and can be calculated in any manner. For example, in a case of the user query and the answer candidate being text, it can be calculated by a method such as counting the number of words that are common to the two texts.

Since $D_i$ is formed of R (R being an integer greater than 0) answer candidates acquired from information provision module units 220, similarity is calculated with the answer candidate having the highest answer score when R is 2 or greater. Alternatively, similarity may be calculated after integrating R answer candidates into one piece of information.

The output control unit 214 selects the agents for display and their answer candidates based on this relevance score score (q, $D_i$). The way of computing the relevance score score (q, $D_i$) and the way selecting the agents for display are not limited to the examples above but various other approaches can be adopted or a system designer may design them as desired.

Next, the output control unit 214 determines the order of agents to be displayed by the display unit 300.

More specifically, the output control unit 214 determines the order of agents to be displayed by the display unit 300 such that agents for which the relevance score score (q, $D_i$) calculated according to Expression (1) is higher are ranked high.

Optionally, only either one of the processing to select the agents for display and the processing to determine the order of the agents for display may be performed.

Here, the output control unit 214 maintains the consistency of interaction between the agents and the user and enables natural dialogue by previously setting display rules as shown below. The user's satisfaction can be also increased by avoiding overlaps and ranking answer candidates in accordance with the user query.

<Rule 1>

If an agent A to which the user has talked (the agent designated by mention @ in the user query) is not included in the agents that are selected based on the relevance score, add the agent A to which the user has talked (and its answer candidate) to the selected agents (and their answer candidates).

<Rule 2>

Display the answer candidate of the agent A at the top when determining the order of the agents for display.

<Rule 3>

If there are an agent A to which the user has talked and an agent B having a higher answer score than that of the agent A, display the answer candidate of the agent B as the answer candidate of the agent A.

Figure 4:
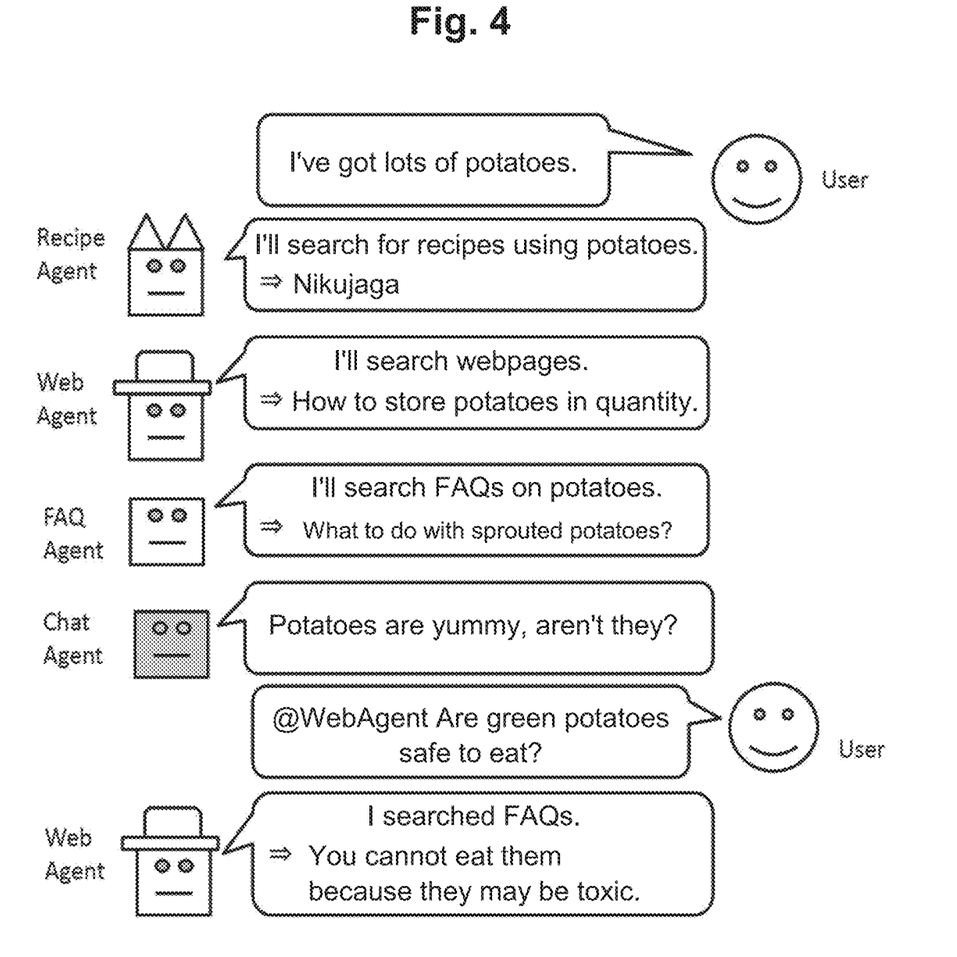
FIG. 4 shows an exemplary interface of the information provision device according to an embodiment the present invention.
Figure 5:
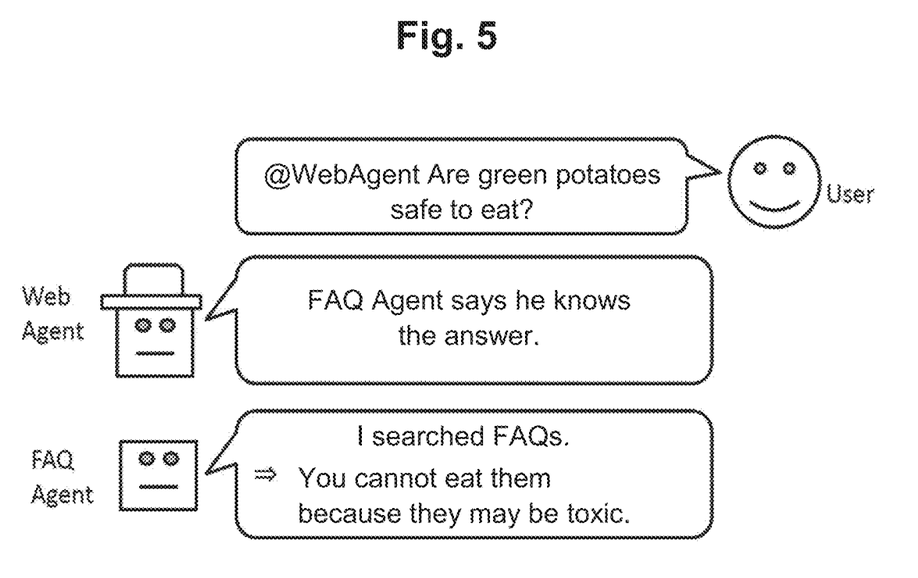
FIG. 5 shows an exemplary interface of the information provision device according to an embodiment the present invention.

For example, when the user asks a similar question to the one in FIG. 2 to the Web Agent as in the example of FIG. 4, it is expected that the relevance score score (q, $D_i$) for a FAQ search result is higher than the relevance score score (q, $D_j$) for Web search. In this case, a reply from the Web Agent to which the user has talked would be natural in terms of the flow of conversation; however, what the user wants to know is probably included in the FAQ search result. Thus, the FAQ search result is displayed in association with the Web Agent. This can maintain the consistency of interaction between the agents and the user, and enables natural dialogue.

<Rule 4>

If there are an agent A to which the user has talked and an agent B having a higher answer score than that of the agent A, the agent. A replies that the agent B is going to answer and then the agent B give an answer (the example in FIG. 5).

<Rule 5>

If there are overlapping answer candidates, delete overlapping portions.

<Rule 6>

If there are overlaps between past answers stored in the memory and the current answers, delete them.

By setting such display rules, overlapping contents of the displayed answer candidates are avoided and the answer candidates are ranked in accordance with the user query from the user, thus increasing the user's satisfaction. It is not necessary to set all of the display rules shown above; they may be adopted selectively.

By ranking the answer candidates based on such display rules according to the user query from the user, the user's satisfaction can be increased.

Each information provision module unit 220 generates one or more answer candidates.

More specifically, the information provision module unit 220 generates one or more answer candidates for output based on the answer generation processing corresponding to its function.

When the information provision module unit 220 generates multiple answer candidates, it may send a certain number (denoted as R) of answer candidates out of the generated answer candidates to the answer acquiring unit 213. For example, if the function of the information provision module unit 220 is Web search, it may send top three (R=3) search results as the multiple answer candidates. Alternatively, instead of giving a search result as an answer candidate as it is, the search result may be converted to link address information for accessing it and the like, which may then be given as an answer candidate.

The information provision module unit 220 also computes an answer score.

More specifically, the information provision module unit 220 also computes numerical information, such as a score obtained during generation of an answer candidate, as the answer score. The way of computing the answer score is determined depending on the answer generation processing of each information provision module 220. For example, for Web search, similarity between the user query and a search result may be computed as the answer score along with the search result.

The information provision module unit 220 converts the computed answer score into a value that can be compared between information provision modules, such as by normalizing it into 0-1. Alternatively, the answer score may be a value that takes into account whether the user query is a query to the agent that is associated with the information provision module unit 220 itself. For example, a method such as adding or subtracting a predetermined value depending on whether the user query is intended for the information provision module unit 220 itself or not may be adopted.

Then, the information provision module unit 220 sends the generated multiple answer candidates and the computed answer score to the answer acquiring unit 213.

As has been described above, with the information provision device according to the second embodiment, when multiple answer candidates are acquired, the output control unit performs control such that overlapping ones of the answer candidates are aggregated when displayed on the display unit, or such that the answer candidates are displayed on the display unit in accordance with their similarity with the user query. Thus, appropriate information can be provided for a user query.

Also, with the information provision device according to the second embodiment, the input unit accepts an input of a user query from the user and also accepts designation of a query target agent, and if the output control unit accepts the designation of the query target agent, the output control unit causes answer candidates having a high degree of relevance to the user query among the answer candidates acquired by the answer acquiring unit to be displayed on the display unit together with information on the query target agent on a per-agent basis. Accordingly, natural dialogue is enabled and the user's satisfaction can be increased.

The present invention is not limited to the above embodiments but various modifications and applications are possible without departing from the scope of the invention.

In the above-described embodiments, the control unit 200 includes at least one information provision module unit 220, but an upper limit is infinite within the range of machine resource. The information provision module unit 220 may also be a function possessed by an external device.

If the information provision module unit 220 is an external device across a network, the query sending unit 212 transmits a user query and answer history to the information provision module unit 220 over the network. In such a case, the answer acquiring unit 213 receives a user query sent from the information provision module unit 220 over the network.

Such an arrangement enables utilization of various information provision module units 220 having different functions on the network, which enhances availability and ensures redundancy in the event of a failure.

In the above-described embodiments, the output control unit 214 selects the agents for display and determines the order of display after associating each information provision module unit 220 with an agent. However, the sequence of operation may be such that the information provision module units 220 for display are selected and the order of display is determined, followed by association of each information provision module with an agent.

While in the above-described embodiments the query sending unit 212 sends a user query to all of the information provision module units 220, it may be arranged to select information provision module units 220 to which the user query is sent. That is, it may select information provision module units 220 for execution.

In this case, multiple information provision module units 220 can be selected for sending the user query, or the user query may be sent only to a function for which designation of a target, e.g., mention @, is present in the user query.

Such an arrangement can reduce unnecessary processing and allows only processing required for the user to be performed, thus improving calculation speed and increasing the user's satisfaction.

It is also possible to send a user query after performing task classification and narrowing down information provision module units 220 (task functions) that match the content of the user query to a certain degree as in conventional techniques.

As a variation of Rule 1 in the above embodiment, a case is presented where the input unit 100 accepts an input of a user query from the user as well as designation of a query target agent, and the output control unit 214 accepts the designation of the query target agent. Then, among the answer candidates acquired by the answer acquiring unit 213, answer candidates having a high degree of relevance to the user query may be displayed on the display unit 300 with information on the query target agent.

Also, while the multiple information provision module units 220 are independent from each other, what is required is that answer candidates from the information provision module units 220 resulting from their answer generation processing are finally independent from each other. Thus, for example, multiple different information provision module units 220 may reference the same database and each send an answer candidate from a different type of answer generation processing to the answer acquiring unit 213.

While embodiments where a program is pre-installed are described herein, the program may be provided on a computer-readable recording medium.

REFERENCE SIGNS LIST 10 information provision device
100 input unit
200 control unit
210 agent managing unit
211 continuity determination unit
212 sending unit
213 answer acquiring unit
214 output control unit
220 information provision module unit
300 display unit

The invention claimed is:

1. A computer-implemented method for providing information in response to a query input, the method comprising:
    receiving a user query as an input;
    transmitting the received user query;
    receiving a plurality of answer candidates for the user query from a plurality of information providers, wherein the plurality of information providers include a first information provider generating a first answer candidate based on a first answer generation process and a second information provider generating a second answer candidate based on a second answer generation process, the first answer generation process and the second answer generation process respectively use distinct methods of preprocessing the received user query from each other, the distinct methods of preprocessing the user query include a morphological analysis, a syntactic analysis, and a named entity extraction of the user query, and the plurality of answer candidates include a first answer candidate from the first information provider and a second answer candidate from the second information provider; and
    displaying the received plurality of answer candidates using a plurality of agents, wherein the plurality of agents includes a first agent corresponds to the first information provider with the first answer candidate and a second agent corresponds to the second information provider with the second answer candidate, and the first agent and the second agent are distinct.

2. The computer-implemented method of claim 1, the method further comprising:
    determining that the received user query relates to at least one of a past user query or an answer to the past user query;
    based on the determination, transmitting the user query to each one of the plurality of information providers with at least one of the past user queries or the answer displayed in response to the past user query; and
    generating, by the plurality of information providers, the plurality of answer candidates based at least on: the user query and at least one of the past user query or the answer to the past user query.

3. The computer-implemented method of claim 1, the method further comprising:
    aggregating the plurality of answer candidates by eliminating duplicate answer candidates in the plurality of answer candidates; and
    displaying the aggregated plurality of answer candidates.

4. The computer-implemented method of claim 1, the method further comprising:
    displaying one or more chat bot characters, the one or more chat bot characters representing one or more of the plurality of agents.

5. The computer-implemented method of claim 1, the method further comprising:
    receiving an identifier of one of the plurality of agents;
    determining the first answer candidate of the plurality of answer candidates based on relevance to the received user query; and
    displaying the determined first answer candidate along with the identified one of the plurality of agents.

6. The computer-implemented method of claim 1, wherein the first information provider relates to a first task for generating the first answer candidate in response to the received user query, the second information provider relates to a second task for generating the second answer candidate in response to the received user query, the first information provider uses a morphological analysis in the preprocessing of the received user query, the second information provider uses a syntactic analysis in the preprocessing of the received user query, and
    the first task and the second task are distinct.

7. A system for providing information in response to a user query, the system comprising:
    a processor; and
    a memory storing computer executable instructions that when executed by the processor cause the system to:
        receive a user query as an input;
        transmit the received user query;
        receive a plurality of answer candidates for the user query from a plurality of information providers, wherein the plurality of information providers include a first information provider generating a first answer candidate based on a first answer generation process and a second information provider generating a second answer candidate based on a second answer generation process, the first answer generation process and the second answer generation process respectively use distinct methods of preprocessing the received user query from each other, the distinct methods of preprocessing the user query include a morphological analysis, a syntactic analysis, and a named entity extraction of the user query, and the plurality of answer candidates include a first answer candidate from the first information provider and a second answer candidate from the second information provider; and display the received plurality of answer candidates using a plurality of agents, wherein the plurality of agents includes a first agent corresponds to the first information provider with the first answer candidate and a second agent corresponds to the second information provider with the second answer candidate, and the first agent and the second agent are distinct.

8. The system of claim 7, the computer executable instructions that when executed by the further cause the system to:
determine that the received user query relates to at least one of a past user query or an answer to the past user query;
based on the determination, transmit the user query to each one of the plurality of information providers with at least one of the past user queries or the answer displayed in response to the past user query; and
generate, by the plurality of information providers, the plurality of answer candidates based at least on: the user query and at least one of the past user queries or the answer to the past user query.

9. The system of claim 7, the computer executable instructions that when executed by the processor further cause the system to:
aggregate the plurality of answer candidates by eliminating duplicate answer candidates in the plurality of answer candidates; and
display the aggregated plurality of answer candidates.

10. The system of claim 7, the computer executable instructions that when executed by the processor further cause the system to:
display one or more chat bot characters, the one or more chat bot characters representing one or more of the plurality of agents.

11. The system of claim 7, the computer executable instructions that when executed by the processor further cause the system to:
receive an identifier of one of the plurality of agents;
determine the first answer candidate of the plurality of answer candidates based on relevance to the received user query; and
display the determined first answer candidate along with the identified one of the plurality of agents.

12. The system of claim 7, wherein the first information provider relates to a first task for generating the first answer candidate in response to the received user query, the second information provider relates to a second task for generating the second answer candidate in response to the received user query, the first information provider uses a morphological analysis in the preprocessing of the received user query, the second information provider uses a syntactic analysis in the preprocessing of the received user query, and the first task and the second task are distinct.

13. A computer-readable non-transitory recording medium storing computer-executable instructions that when executed by a processor cause a computer system to:
receive a user query as an input;
transmit the received user query;
receive a plurality of answer candidates for the user query from a plurality of information providers, wherein the plurality of information providers include a first information provider generating a first answer candidate based on a first answer generation process and a second information provider generating a second answer candidate based on a second answer generation process, the first answer generation process and the second answer generation process respectively use distinct methods of preprocessing the received user query from each other, the distinct methods of preprocessing the user query include a morphological analysis, a syntactic analysis, and a named entity extraction of the user query, and the plurality of answer candidates include a first answer candidate from the first information provider and a second answer candidate from the second information provider; and
display the received plurality of answer candidates using a plurality of agents, wherein the plurality of agents includes a first agent corresponds to the first information provider with the first answer candidate and a second agent corresponds to the second information provider with the second answer candidate, and the first agent and the second agent are distinct.

14. The computer-readable non-transitory recording medium of claim 13, the computer-executable instructions when executed further causing the system to:
determine that the received user query relates to at least one of a past user query or an answer to the past user query;
based on the determination, transmit the user query to each one of the plurality of information providers with at least one of the past user queries or the answer displayed in response to the past user query; and
generate, by the plurality of information providers, the plurality of answer candidates based at least on: the user query and at least one of the past user queries or the answer to the past user query.

15. The computer-readable non-transitory recording medium of claim 13, the computer-executable instructions when executed further causing the system to:
display one or more chat bot characters, the one or more chat bot characters representing one or more of the plurality of agents.

16. The computer-readable non-transitory recording medium of claim 13, the computer-executable instructions when executed further causing the system to:
receive an identifier of one of the plurality of agents;
determine the first answer candidate of the plurality of answer candidates based on relevance to the received user query; and
display the determined first answer candidate along with the identified one of the plurality of agents.

17. The computer-readable non-transitory recording medium of claim 13, wherein the first information provider relates to a first task for generating the first answer candidate in response to the received user query, wherein the second information provider relates to a second task for generating the second answer candidate in response to the received user query, and wherein the first task and the second task are distinct.

* * * * *